No. 802,696. PATENTED OCT. 24, 1905.
C. W. JACKSON & J. A. MINTURN.
MANUFACTURE OF MUSH.
APPLICATION FILED DEC. 18, 1903.
3 SHEETS—SHEET 1.
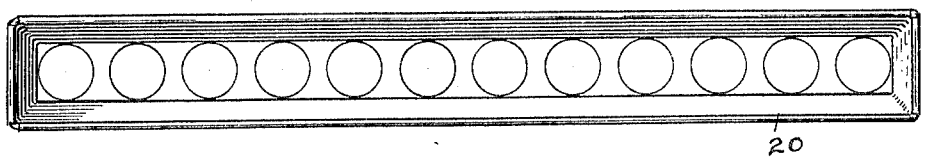
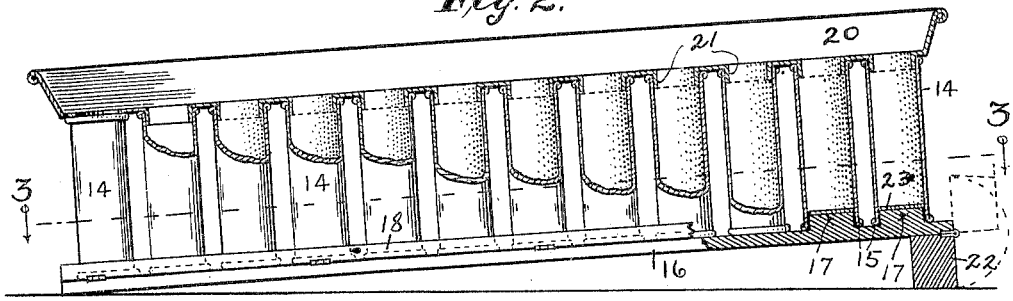
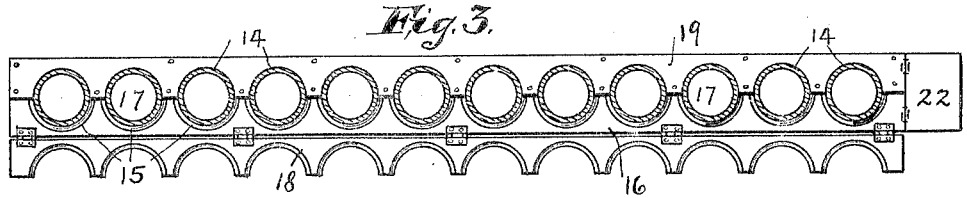
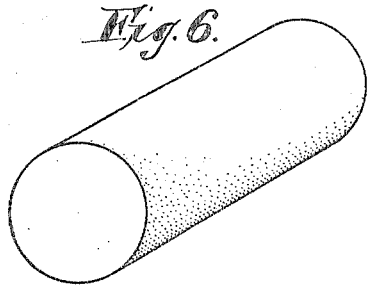
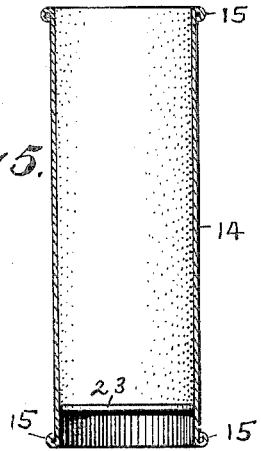
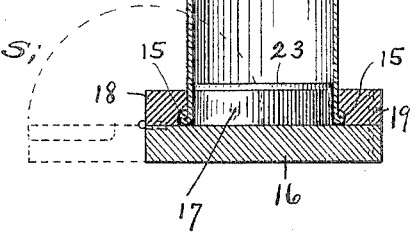
Witnesses:
John B. Sherwood
S. Mahlen Kriger
Inventors,
Cyrus W. Jackson &
Joseph A. Minturn.
By Joseph A. Minturn
Attorney.

No. 802,696. PATENTED OCT. 24, 1905.
C. W. JACKSON & J. A. MINTURN.
MANUFACTURE OF MUSH.
APPLICATION FILED DEC. 18, 1903.
3 SHEETS—SHEET 2.
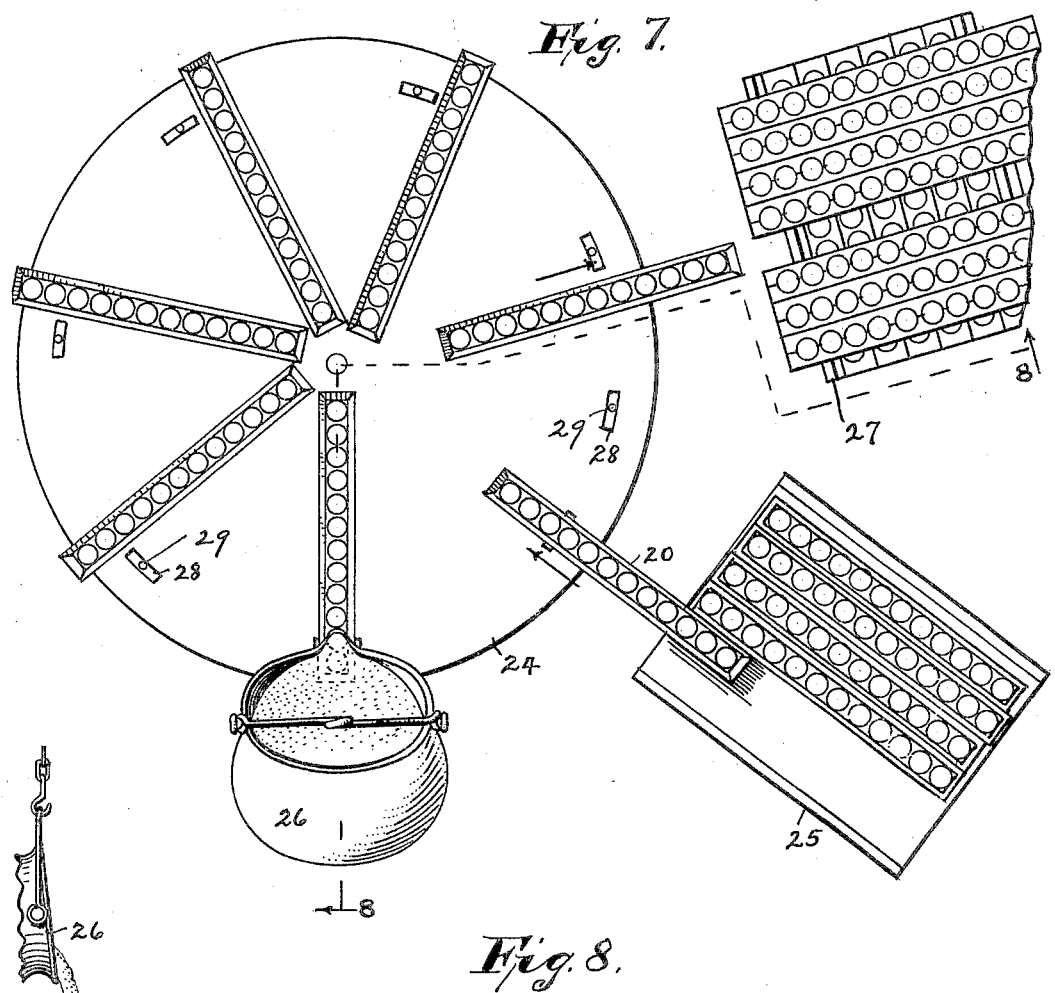
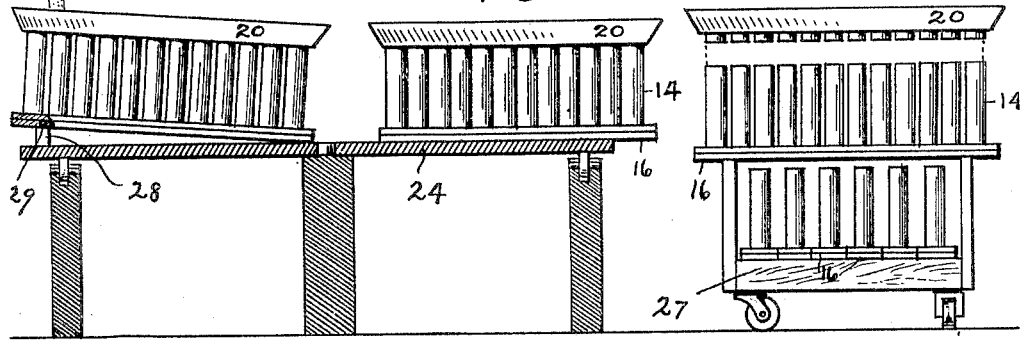
Witnesses:
Inventors
Cyrus W. Jackson and
Joseph A. Minturn
By Joseph A. Minturn
Attorney.

No. 802,696. PATENTED OCT. 24, 1905.
C. W. JACKSON & J. A. MINTURN.
MANUFACTURE OF MUSH.
APPLICATION FILED DEC. 18, 1903.
3 SHEETS—SHEET 3.
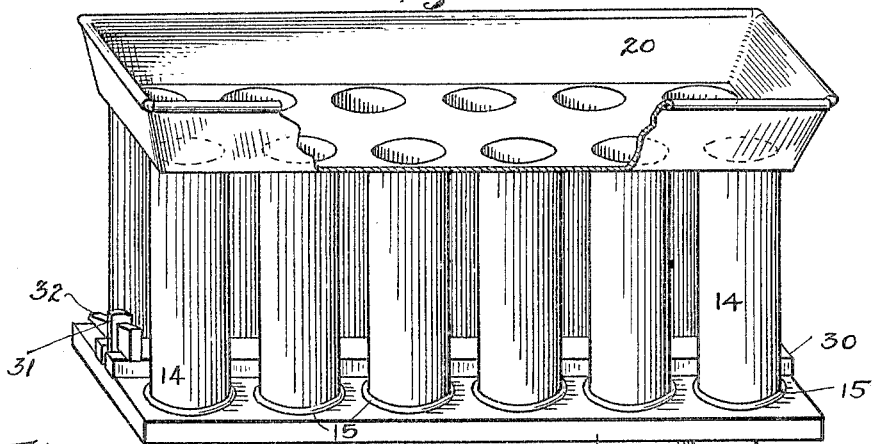
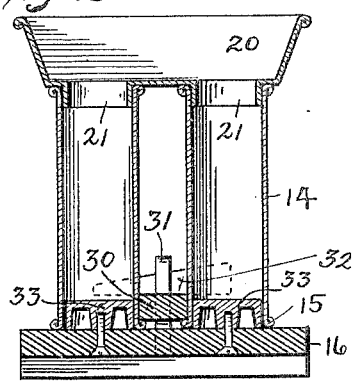 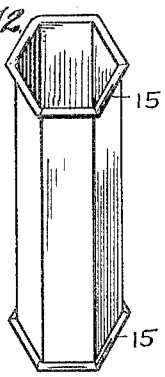 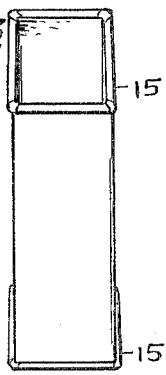
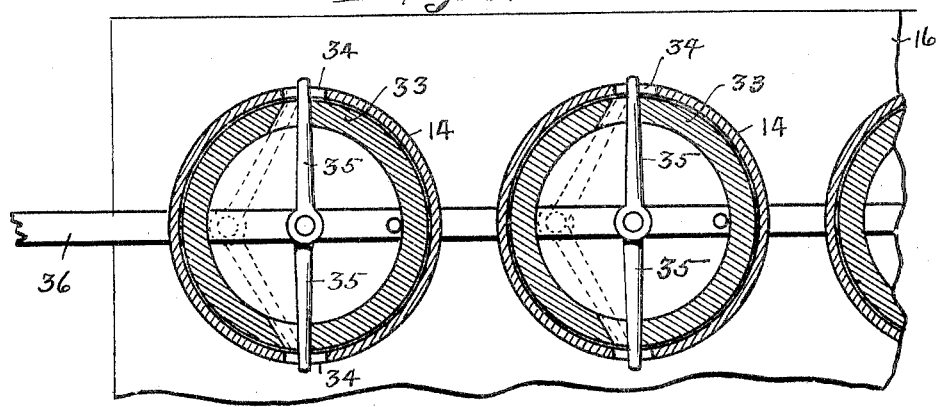
Witnesses,
John R Sherwood
S Mahlon Unger
Inventors,
Cyrus W. Jackson and
Joseph A Minturn
By Joseph A Minturn
Attorney.

UNITED STATES PATENT OFFICE.

CYRUS W. JACKSON AND JOSEPH A. MINTURN, OF INDIANAPOLIS, INDIANA.

MANUFACTURE OF MUSH.

No. 802,696.  Specification of Letters Patent.  Patented Oct. 24, 1905.

Application filed December 18, 1903. Serial No. 185,687.

*To all whom it may concern:*

Be it known that we, CYRUS W. JACKSON and JOSEPH A. MINTURN, citizens of the United States, residing at Indianapolis, in the county of Marion and State of Indiana, have invented certain new and useful Improvements in the Manufacture of Mush, of which the following is a specification.

This invention relates to improvements in the manufacture for commercial purposes of food products, of which cooked cereals, principally maize, will form the main constituent or body. This will be put out in the form of mush of such consistency as to retain a given shape.

The invention has special reference to the marketing in acceptable packages of a food product of the above nature which we have developed by long experiment and which is made in cylindrical, rectangular, and kindred shapes, first wrapped in paraffin or oiled paper, around which a neat outer wrapper is afterward placed.

The object of this invention is to provide a mold for molding the above food product and a satisfactory means for filling and removing the contents of the molds.

We accomplish the objects of the invention by the mechanism illustrated in the accompanying drawings, in which—

Figure 1 is a top or plan view of a hopper which fills a dozen molds arranged in a single straight line; Fig. 2, a side elevation and partial vertical section of said row of molds; Fig. 3, a horizontal section on the line 3 3 of Fig. 2; Fig. 4, a transverse vertical section, on an enlarged scale, through the axis of one of the molds of Fig. 2; Fig. 5, a vertical section of a filled mold with the hopper removed and the mold removed from the base preparatory to the discharge of the molded food; Fig. 6, a perspective view of the molded product; Fig. 7, a plan view of a rotary molding-table with trucks supplying empty molds and receiving filled ones; Fig. 8, a vertical section on the line 8 8 of Fig. 7; Fig. 9, a perspective view of a set of molds arranged in two rows of six in a row and showing a modified fastening for securing the molds to the base; Fig. 10, a transverse vertical section through the axes of a pair of molds of Fig. 9; Fig. 11, a detail in horizontal section through the base and molds of a modified form of attachment of molds to said base; Fig. 12, a perspective view of a mold hexagonal in cross-section, and Fig. 13 a like view of a square or rectangular mold.

Like characters of reference indicate like parts throughout the several views of the drawings.

14 is a tubular mold, preferably of tin, open at both ends. The ends are finished with an outside turn of the tin to form the enlargement or bead 15, which not only gives a finish and strength to the mold, but affords a hold for fastening the mold to a supporting-base. 16 is such base, which is preferably of wood and has the circular wooden blocks 17, one for each mold, fastened to its top surface. The diameter of these blocks is approximately one-sixteenth of an inch less than that of the molds, so as to allow the molds to be placed readily with one of their open ends surrounding the respective blocks in the manner shown in Figs. 2 and 4. A holding-board 18, with semicircular notches to receive the molds, but of less diameter than the beads 15, is hinged to one side of the base in a manner to permit of its being folded outwardly away from the molds to permit of the placing of the latter and then folded in against the molds to prevent displacement of the molds. A stationary holding-plate 19 may be used, if desired, in connection with the hinged one, the opening out of the latter permitting the insertion of the molds without moving the stationary holding-plate; but as a rule this will not be used, as it is not really necessary.

20 is a hopper of sufficient dimensions to take in the tops of all of the molds on a single base. This hopper will have openings through its bottom with under side rings or collars 21 to enter the open tops of the molds. The collars are small enough in diameter to fit loosely into the molds, so as to allow of easy adjustment and removal. The cooked food, which is of a stiff mushy consistency, is now poured into one end of the hopper, and to facilitate the filling of the further molds the base under the receiving end is elevated, so as to give a slope to the hopper-bottom. As the mush should be stiff, it will not flow very freely, and its movement will be accelerated by the use of a paddle or scraper by which it is dragged or pushed along and into the molds. For convenience in raising the base at one end a hinged block 22 will be provided, as shown in Figs. 2 and 3. When the base is to stand horizontally, the block will be in the position shown in dotted lines in Fig. 2; but when the end of the base is to be elevated the block will occupy the position shown in full lines in said Fig. 2.

To prevent contact and adhesion of the mush to the wood blocks 17 and also to form a hard unyielding surface to press against in starting the mush from the mold after it has cooled, we provide the tin disk 23, which is laid loosely in the mold on top of the block. This block 17 is approximately one inch in height, and hence extends that distance into the mold, whereby when the filled mold is lifted off of the base a one-inch empty space will exist at the bottom of the mold, as illustrated in Fig. 5. The extension of this block 17 into the bottom of the mold acts as an effectual barrier to prevent the leakage of the mush at said bottom, and the empty space formed by it on the removal of the filled mold from the base permits of the loosening of the mass and the starting of its discharge by the tapping of that end down against a table or other firm surface. After the molded mass has been started the natural gelatinous formation of its outer coating causes it to discharge readily from the mold.

The hopper 20 will be removed after the molds are filled and before the mush has set, so as not to leave a mark in the mush at that end. To enable this to be done without displacing the molds makes necessary the locking the molds to their base in the manner as previously described. This locking is also important to prevent accidental displacement of the molds in handling.

The molds may be filled one at a time by pouring the mush from a dipper or ladle directly into each, and the hopper thereby dispensed with.

Figs. 7 and 8 illustrate the use of a circular rotary table 24, upon which the empty molds from a wheeled truck 25 are placed and brought by a partial rotation of the table under the mush-pot 26 and filled ones as they come around in reach of the operator, who places the emptys, are removed by him and are piled upon another truck 27. The latter truck when filled is wheeled away for the product to cool and is replaced by an empty one. Permanent blocks 28 are fixed on the table to raise the pouring end of the series of molds while filling. They are provided with pins 29, which enter holes in the bottoms of the mold-bases, as shown in Fig. 8, to keep the bases on the blocks. This rotary table is only necessary where the manufacture is on a scale of sufficient magnitude to justify it. It is the purpose to manufacture this food product and sell it locally and the plant required will depend upon the size of the local market.

In the modification shown in Figs. 9 and 10 a dozen molds are grouped in two rows of six each, which, while the filling of the molds may not be as conveniently accomplished as where the molds are in a single row, the double row permits of a shorter and wider base, which is more stable, and requires a revolving table of half the diameter of the long ones, an item of importance where the floor-space of the factory is limited. In this modification the molds are locked to the base by the bar 30, which rests between the two rows of molds upon their lower beads and is held there by post 31, which passes through the slotted ends of the bar 30, and wedge 32, driven through a slot in the post, above the bar, or by any other suitable fastening. The modification as shown in Fig. 10 uses a metal block 33, preferably of aluminium or other non-corrosive metal, and when so used the tin disks 23 are dispensed with.

The modification shown in Fig. 11 contemplates the use of horizontal slots 34 through the walls of the mold, which are entered by pins 35, hinged to a rod 36, having a longitudinal adjustment whereby, as shown by the dotted lines, the pins may be withdrawn from said slots.

While the preferred form of mold is the cylindrical one, rectangular, hexagonal, and other shaped molds may be used without departing from the spirit of this invention.

Having thus fully described our invention, what we claim as new, and wish to secure by Letters Patent, is—

1. A tubular mold open at both ends, a base upon which one end of the mold rests and a block of the same contour as the bore of the tube secured to the base and extended loosely that is, with a surrounding air-space into said tube so as to retain the mush but allow a free escape of air past said block, the tube being set loosely on the base.

2. A mold for mush comprising continuous side walls with both ends normally open and with a free interior adapted to be filled with the product to be molded and a closure for one end formed to permit the escape of air but prevent the escape of mush and to be engaged with and separated from said mold by a movement in the direction of its length, substantially as set forth.

3. A tubular mold open at both ends, a base upon which one end of the mold rests, a block of the same contour as the bore of the tube secured to said base and extended loosely into the said tube, so as to allow the escape of air but not of mush, and a separate disk placed in the mold upon said block.

4. A tubular mold open at both ends, a base upon which one end of the mold rests, and a block of the same contour as the bore of the tube secured to the base and extending into the tube so as to prevent the escape of mush but not air-tight.

5. A tubular mold open at both ends, a base upon which one end of the mold rests, a block of the same contour as the bore of the tube secured to said base and extending into the said tube to prevent the escape of mush but not making an air-tight fit and means for removably securing the tube to the base whereby the tube may be readily released and removed from the base and block.

6. A tubular mold open at both ends, a base upon which one end of the mold rests, a block of the same contour as the bore of the tube secured to said base and extending loosely into said tube to prevent the escape of mush but not making an air-tight fit, and a separate disk loosely placed in the mold upon said block.

7. A tubular mold open at both ends and having a uniform diameter throughout its length, a base upon which one end of the mold rests, a block of the same contour as the bore of the tube, secured to said base and extending loosely that is, not air-tight into said tube to prevent the escape of mush but not of air, a disk placed loosely in the mold upon said block and means for removably securing the tube to the base.

8. A series of tubular molds each open at both ends and having a uniform bore, a common base upon which an end of each mold rests, a block for each mold secured to the base and loosely entering its respective mold to prevent the escape of mush but not being air-tight, and a hopper from which all of the molds are fed in filling them.

9. A series of tubular molds open at both ends and having a uniform bore, a common base upon which an end of each mold rests, a block for each mold secured to the base and loosely entering its respective mold to prevent the escape of mush but not being air-tight and a hopper removably secured to said molds having discharge-openings into each of them for filling the molds.

10. A series of tubular molds open at both ends having a uniform bore, a common base upon which an end of each mold rests, a block for each mold secured to the base and loosely entering its respective mold to prevent the escape of mush but not air-tight, means for removably securing the molds to said base and a hopper removably secured to said molds, having discharge-openings into each of them for filling same.

11. A tubular mold open at both ends, having an outside bead, a base, a centering-block secured to the base and entering the mold and a bar resting upon the said bead, said bar being secured to the base.

12. A tubular mold open at both ends having an outside bead, a base having a centering-block loosely entering the end of the mold, a bar resting against the bead on its opposite side from said base and means for removably securing the bar to the base.

13. A series of tubular molds, a base to which they are removably secured, projections from said base into said molds closing same against the escape of mush while permitting the escape of air, a hopper connecting and communicating with the mouths of all of the molds and means for elevating one end of the base.

14. A series of tubular molds open at both ends, a hopper communicating with the upper ends of all of said molds, a base upon which the lower ends of the molds rest, projections from said base into the molds closing same against mush discharge while permitting the escape of air, and a rotary table on which the base is placed having blocks upon which one end of said base is elevated while the other remains stationary.

15. A series of tubular molds open at both ends having a uniform bore and having an outside bead at their ends, a common base upon which an end of each mold rests, a block for each mold secured to the base and loosely entering its respective mold, a bar movably secured to the base and resting upon the bead.

16. A series of tubular molds open at both ends having a uniform bore and having an outside bead at each of their lower ends, a hopper communicating with the upper ends of all of said molds, a common base upon which an end of each mold rests, a block for each mold secured to the base and loosely entering its respective mold, a bar movably secured to the base and resting upon the beads.

17. In a mold for mush rolls, a series of tubular molds of uniform bore open at both ends and having an outside bead at their lower ends, a base having blocks making loose fits in the ends of said molds and a locking-bar hinged at its outer edge to the base and adapted to be folded over upon the said beads to lock the molds to said base.

18. In a mold for forming mush rolls, a series of tubular molds of uniform bore open at both ends having an outside bead at their lower ends, a base having blocks making loose fits in the lower ends of said molds and a locking-bar having notches to receive the molds to lock said molds to the base, said bar being hinged to the base whereby it may be folded or swung out to release the molds.

19. A series of tubular molds open at both ends and having a uniform bore for forming a merchantable mush in rolls as described, a common base upon which an end of each mold rests, a block for each mold secured to the base and loosely entering its respective mold, that is, not making an air-tight fit, means for removably securing the molds to said base and a hopper removably secured to said molds having discharge-openings into each mold and a collar or flange around said openings on the under side of the hopper to enter the mouth of the mold.

20. A tubular mold, a base on which the mold is removably placed, said base having a projection which enters the mold and prevents the escape of mush while permitting of the free escape of air.

21. A tubular mold, a base on which the mold is removably placed, said base having a projection which enters the mold and prevents the escape of mush while permitting of the free escape of air and means for fastening the mold to the base.

22. A mold for forming mush comprising a casing with continuous walls a free unobstructed interior and open at both ends removably mounted upon a base formed to serve as a closure for the lower end of said casing and to provide an air-vent, whereby said mold may be lifted from the base and the mush freely removed therefrom, substantially as set forth.

23. A mold for mush having continuous sides but open at both ends and a removable closure with a smooth surface for one end adapted to prevent the escape of mush but allow the escape of air, said closure being formed to engage or disengage with said mold by a movement in the direction of the length of said mold, substantially as set forth.

24. A mold for mush comprising a casing with a free interior having continuous walls but open at both ends and a closure for one end with a square end adapted to extend within said casing and to engage said casing by a sliding movement and formed to allow the escape of air, substantially as set forth.

25. A mold for mush comprising a free casing, open at both ends mounted upon a base with a closure having a square end adapted to extend within the lower end of said casing and formed to permit the escape of air but not the escape of mush, substantially as set forth.

In witness whereof we have hereunto set our hands and seals, at Indianapolis, Indiana, this 10th day of December, A. D. 1903.

CYRUS W. JACKSON. [L. S.]
JOSEPH A. MINTURN. [L. S.]

Witnesses:
S. Mahlon Unger,
John B. Sherwood.